United States Patent

[11] 3,620,766

| [72] | Inventor | Charles H. Wallace |
| | | Toledo, Ohio |
| [21] | Appl. No. | 837,995 |
| [22] | Filed | June 16, 1969 |
| [45] | Patented | Nov. 16, 1971 |
| [73] | Assignee | Schmidt-Wallace, Inc. |
| | | Toledo, Ohio |
| | | Continuation of application Ser. No. 657,423, July 31, 1967, now abandoned, Continuation of application Ser. No. 517,144, Dec. 3, 1965, now abandoned, Continuation-in-part of application Ser. No. 272,452, , now abandoned, Continuation-in-part of application Ser. No. 212,306, , now Patent No. 3,204,844. |

[54] METHOD FOR PRODUCING SKINLESS WIENERS
5 Claims, 2 Drawing Figs.

[52] U.S. Cl. .................................................. 99/109
[51] Int. Cl. .............................................. A22c 11/00
[50] Field of Search .......................................... 99/107, 108, 109, 175, 176

[56] References Cited
UNITED STATES PATENTS

| 3,029,148 | 4/1962 | Zboralski | 99/109 X |
| 3,220,855 | 11/1965 | Shank | 99/109 X |
| 3,361,577 | 1/1968 | Simon et al. | 99/176 |

Primary Examiner—Hyman Lord
Attorney—Allen D. Gutchess, Jr.

ABSTRACT: Skinless wieners are produced by treating them with an acid at a pH not more than 4 prior to cooking and subsequent processing. The acid can be sprayed over the wiener sections as they pass through a spray hood prior to entering an oven, and is preferably edible. The acid treatment causes a skin to be formed on the wiener product under the artificial casing which enhances the chewiness of the wiener and improves the peelability thereof.

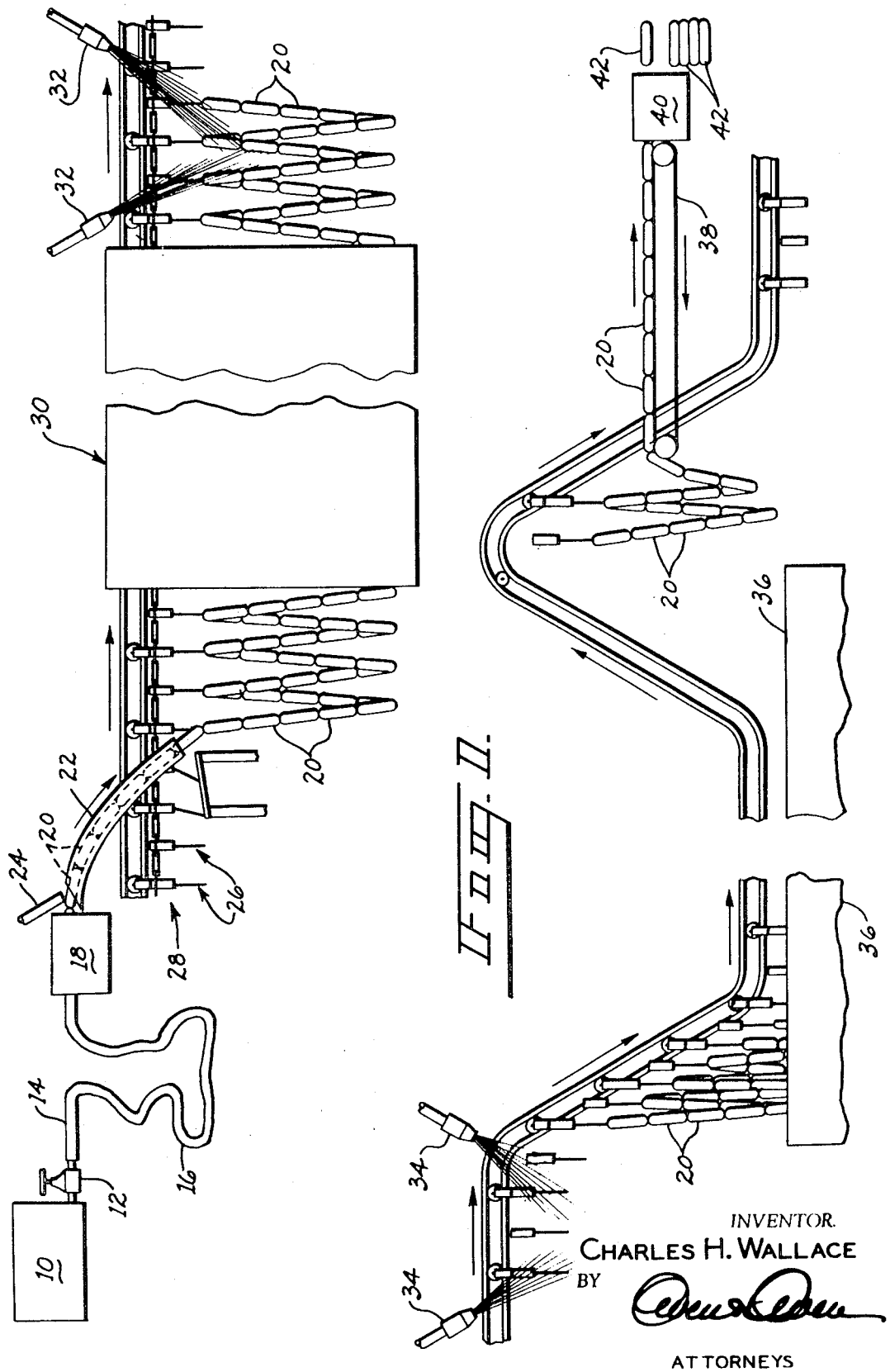

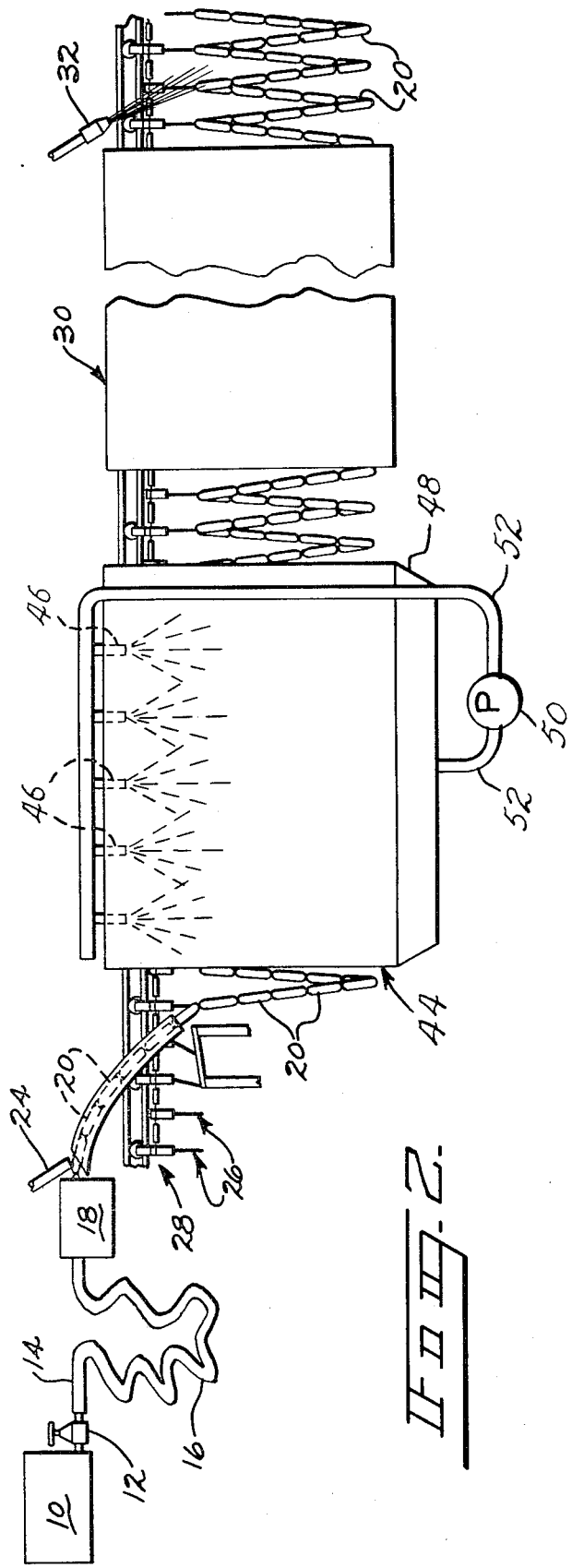

METHOD FOR PRODUCING SKINLESS WIENERS

This application is continuation of Ser. No. 657,432, now abandoned, which is a continuation of Ser. No. 517,144, now abandoned, which is a continuation-in-part of Ser. No. 272,452, now abandoned, which is a continuation-in-part of Ser. No. 212,306, now U.S. Pat. No. 3,204,844. This invention relates to an improved method and apparatus for producing wieners and particularly to a method and apparatus for producing cured skinless wieners.

Previously, wieners have been made by encasing the ground meat product in intestinal gut which formed part of the final food product. In recent years, this process has been largely abandoned and replaced by a process in which the ground meat product employed in the wiener has been encased in a long cellulose tube, tied into uniform lengths and brought up to curing temperature. Subsequently, the cellulose casing is removed so that the wiener consists of the ground meat product only. This product has become known as a skinless wiener. The prior wiener with the intestinal casing was relatively chewy because of the relatively tough casing material. In contrast, the skinless wiener is quite tender, having no corresponding outer reinforcement. If has been discovered, however, that a certain degree of toughness or chewiness in the wiener is desired by the consumer, and that the saleability of the product is actually enchanced thereby. It has further been discovered, in accordance with the invention, that the process used in the production of the wiener can be modified to produce a desired degree of so-called toughness or chewiness therein and overcome the above disadvantage.

In the production of wieners, the ground meat product is first forced, in a relatively fluid state, into the tubular cellulose casing, after which the casing is tied into wiener-length sections and then passed through an oven for the curing or treating step. The oven may or may not include an atmosphere of smoke. After heating, the wiener product is cooled and chilled and the casing is removed and the wiener units are then separated and packed. The heating or curing process employed in the production of the wiener is complex sections and at least four factors must be considered when developing a heating cycle. These factors include the overall length of time required for the curing, the degree of tenderness, the need for pasteurization, and the development of the proper color. Further, what is optimum for one factor often is detrimental for another, which makes the determination of the proper process even more difficult. Thus, as to the length of time, a short curing time and a short process are desired, in the interests of increased productivity and low cost, while, in contrast, the proper tenderness, or perhaps more correctly toughness, requires a substantial amount of time and a fairly high temperature. At the same time, pasteurization requires a high temperature, a minimum of approximately 152° F. at the inside of the meat, while color development requires a fairly long time but a relatively low temperature, in any case not exceeding approximately 165° F. To obtain the high temperatures required for pasteurization in a short and economical time cycle would tend to destroy the color of the product and would fail to attain the proper degree of toughness or texture because this is a product of both time and temperature.

The present invention relates to a method and apparatus for curing wieners in a manner such that the above four factors are satisfied to an extent not heretofore possible. The treatment also enables a skin to be formed on the surface of the wiener product by coagulation so that the chewiness of the wiener is substantially improved. The process, in one embodiment, includes passing the wieners through a spray hood in which an acid is applied to the surface and specifically the cellulose casing, after which the wieners are passed through a curing oven to complete the process. This process is a continuous one wherein the wieners are carried through the spray hood and curing over on a single continuous conveyor. The process in batch form, includes dipping the wieners in an acid bath and then moving the wieners into a smokehouse or curing oven for a predetermined period. In the continuous process, the acid employed must be capable of having the desired effect of producing a skin on the wiener in a period of time dictated by the length of the spray hood and the speed at which the conveyor travels. In the batch process, however, the length of time the wieners are subjected to the acid is capable of greater variation since no continuous conveyor is used. When the wieners are treated with the acid before they are introduced into the oven or smokehouse, the time and temperature limits for the heat treatment are less critical.

It is, therefore, a principal object of the invention to provide an improved method and apparatus for producing wieners having the advantages set forth above. Other objects and advantages of the invention will be apparent from the following detailed description of preferred embodiments thereof, reference being made to the accompanying drawings, in which:

FIG. 1 is a somewhat schematic view in elevation of apparatus for producing wieners; and FIG. 2 is a view similar to FIG. 1, but showing a modification which is particularly advantageous in practicing a preferred embodiment of the invention.

Referring more particularly to FIG. 1, a continuous process for producing wieners will first be discussed. Accordingly, a source 10 of ground meat product, commonly known as a stuffer, forces the ground meat which will become the final wiener product through a valve 12, a nozzle 14 and, hence, into a long, permeable cellulose casing or tubing 16. The casing 16 conventionally comes in 84 foot lengths which are tied together, end-to-end, to provide a continuous operation. The filled casing is then fed through a tying machine 18 which ties the casing into individual uncured wiener sections 20 which remain connected in continuous-end-to-end relationship. The sections 20 are then fed through a plastic loading conduit 22, down which the sections 20 pass with the aid of a lubricating fluid such as water supplied through a nozzle 24.

In a batch-type process as known at the present time, the strings or lengths of wieners are cut to convenient lengths and are festooned by hand over arms of a cart. When the cart is completely loaded it is pushed into a smoke room and curing oven where the load remains until a predetermined time has passed when the cart is taken out for further processing. In the continuous process, after the wieners have passed through the tying machine 18, wieners in the continuous stream are loaded on hangers 26 of a conveyor indicated at 28, to be discussed subsequently in more detail. The wieners 20 then are fed through an oven or furnace 30 in which they are cured, the wieners attaining a proper color by curing, receiving a degree of toughness, and being pasteurized as well as full cooked and smoked, and ready to eat. Upon emerging from the oven 30, the now cured wieners 20 can be subjected to a steam bath with the aid of steam nozzles 32 in order to assure that the wiener sections reach the proper pasteurization temperature of 152° F. throughout their thickness. Subsequently, the wieners can be partially cooled with the aid of a spray of cool water from nozzles 34, after which they can be cooled further by being dipped into and passed through a tank 36 containing a circulating pool of suitable coolant, such as cold water. Upon leaving the tank 36, the now cooled and cured, fully cooked, smoked, and ready to eat wiener sections 20 are removed by a horizontal takeoff belt conveyor 38 as the hangers 26 move from a level thereabove it to a level therebelow. The sections are then fed to a peeling machine 40 which removes the cellulose casing 16 and thereby separates the wiener sections 20 into final individual wiener products 42. These are then packaged by suitable apparatus to complete the overall process.

In the second zone, the wiener sections reach an interior temperature of approximately 152°–160° F. by the time they reach the discharge end. The rate of conveyor movement is such that the wieners in the preferred embodiment spend approximately 20 to 40 minutes in each zone and are in the two zones for approximately 40 to 80 minutes. Specifically, the oven 30 is 170 feet long and the wiener sections are carried therethrough at a rate of approximately 3 feet per minute. This gives a total heating cycle of about 1 hour.

If desired, the wiener sections can be subjected to the steam spray after leaving the oven for a period of from 1 to 9 minutes to assure that the wiener sections are completely pasteurized. The load is then cooled to approximately 90°–130° F. by the water spray for a period of approximately 9 minutes. The wiener sections are then further cooled in the tank 36 for 9 minutes to a temperature of 38°–45° F. by cooling water which is a temperature of approximately 35°–38° F. The cooling technique enables the meat product to shrink away slightly from the casing 16 to facilitate removal thereof in the peeling machine 40. It has been found that the continuous process above-described results in wieners of improved texture, color and flavor at lower cost and with more uniformity than is now attainable with known batch processes or with existing "fast cooking" continuous processes.

FIG. 2 shows a modification of the apparatus of FIG. 1 which is particularly suited for practicing a preferred embodiment of the instant invention. The apparatus of FIG. 2 is substantially identical with that of FIG. 1, except that the conveyor 28 is extended, and a spray hood 44 is provided ahead of the oven 30. In the apparatus of FIG. 2 the wieners, after being loaded onto the conveyor 28, as previously described, pass through the spray hood 44, and then enter the oven 30, where they are processed in any suitable manner, which can be that previously described.

Within the spray hood 44, the festooned wieners are subjected to a suitable liquid spray from heads 46. The liquid material sprayed from the heads 46 provides a surface coating on the festooned wieners, and excess is collected in a sump 48, from which 4 is pumped by a pump 50 through a line 52 back to the heads 46. The liquid spray material must be acidic in nature, and preferably is an aqueous acid solution. Excellent results have been achieved when the acidic material has been an aqueous acid solution of acetic acid, formic acid, propionic acid, lactic acid, oxalic acid, hydrochloric acid, malic acid, sulfuric acid, phosphoric acid, succinic acid, and even citric acid. The aqueous acid solution can contain at least two of the acids. In general, to be suitable for this use, the acid solution must have a pH of 4 or lower, but the foregoing list of specific acids which have been found to be operable demonstrates that the specific identity thereof is not critical.

Any of the acid solutions identified above, or others having a pH of 4 or lower causes preferential coagulation of protein in the wieners at the surfaces thereof, thereby facilitating accomplishment of the surface toughening which has been discussed above as being a requisite of a satisfactory skinless wiener. Even the preferred processing techniques which have been discussed above in considerable detail have been found to be marginal relative to the production of satisfactory skinless wieners by rapid processing techniques, i.e., by processing techniques in which the heating cycle is not longer than about an hour and a quarter to accomplish heating of the wieners, throughout, to a temperature of at least 152° F. to accomplish pasteurization. Extremely close control is required to achieve the requisite surface toughness which is necessary for product acceptability and to prevent "weeping," or seepage of water from the interior of the wiener through the surface skin, without also overcooking interior portions of the wiener. However, when the raw wieners are treated with an acid solution as described above to cause surface coagulation of protein, any reasonable heating cycle which heats the wieners throughout to a temperature of at least 152° F. within a period of time not exceeding an hour and a quarter provides completely acceptable wieners from all standpoints. It has also been found that the acid treatment according to the invention is unexpectedly advantageous even in longer heating cycles, e.g., up to 2 or even 3 hours, in that it causes improved surface sheen and improved coagulation adjacent the surface. However, the improvement in short cycles is completely unexpected, since it is vastly greater than in a long process and the acid treatment prevents such phenomena as "weeping," which are not problems with a long process.

It will be appreciated that, ordinarily, in a continuous process it is preferred that the heating cycle be one which is at least one-half hour in duration, but not longer than an hour and a quarter, and the temperatures involved are such that the wieners are heated throughout to a temperature of at least 152° F., but not higher than 165° F. The aqueous acid solutions preferably contain only acids which are acceptable for use in food products, e.g., acetic acid, limited amounts of formic and propionic acids, lactic acid, citric acid and the like. However, when acids which are not recognized as acceptable for use in food products are employed, a limited amount of sodium hydroxide, ammonium hydroxide, or other suitable base which forms a water soluble salt with the acid employed can be applied to the processed wieners, e.g., through the first of the sprays 34 (FIG. 1) to neutralize the acid as a water soluble salt which is then washed away. In other instances, e.g., when hydrochloric acid is employed, the volatility thereof during the curing cycle causes substantially complete elimination thereof from the wieners, so that no deleterious effect results from ingestion thereof. In a continuous process, optimum results have been achieved when the treating material has been an aqueous acid solution having a pH not higher than about 3.

In addition to increasing the chewiness of the wiener, the skin provides additional advantages in the wiener process. The acid treatment enables a satisfactory wiener to be produced over a wider range of heat treatments. The chances that the wiener will not readily peel when subjected to a peeling machine are also reduced. If a wiener cannot be readily peeled, it cannot be peeled on a peeling machine which is capable of handling perhaps 35,000 wieners an hour. Such wieners must be hand peeled, which is costly from the labor standpoint, and even then the wieners may not be commercially acceptable. With a conventional wiener-treating process, grease in the meat product sometimes migrates to the surface and prevents any skin from forming. By forming the coagulated skin with the acid prior to the heating step, the skin prevents this possibility. Further, with the acid-formed skin, there is no possibility that the skin will revert to a jellylike substance upon subsequent reheating, which can occur with heat-formed formed skins. The tighter skin also decreases the chance for entry of bacteria.

As mentioned earlier, the particular acid used is not important and if the acid is one which is not considered edible, it can be removed by applying a suitable base to the wiener and then washing the wiener. However, if the acid is one which is acceptable for consumption, no steps need be taken at all to remove the acid. Generally, the weaker the acid employed, the longer the time in which the acid must act upon the wiener to produce an acceptable skin, and vice versa. However, the limits are broad and the treatment need not be precise. The time of the treatment for any particular acid will also vary somewhat depending upon the constituents of the meat product. Where the amount of protein is lower, a longer time generally is required to produce a skin of a given thickness. Acceptable skins have been produced on wieners with acid solutions having a pH up to 4 for a period of time from about 0.10 minute to about 60 minutes, and preferably from about 0.25 minute to about 30 minutes. The effect of the acid on the wiener continues after the wiener has been separated from the source of acid, whether it be a spray of a bath. Consequently, it is not necessary for the meat product to be in contact with the source for the entire period of time. The effect of the acid, however, apparently stops when the wiener is subjected to the heat in the heating zone.

By way of example, a sulfuric acid solution at a pH of 0.2 was applied to wieners for periods of time of 0.25 minute, 1.00 minute, and 5.00 minutes. The wieners after the treatment had acceptable skins with thicknesses of 0.020 inch, 0.044 inch, and 0.049 inch respectively.

In another example, a sulfuric acid solution at a pH of 0.3 was applied to wieners for periods of time of 0.50 minute, 1.00 minute, and 5.00 minutes. The wieners after the treatment had acceptable skins with thicknesses of 0.036 inch, 0.043 inch, and 0.047 inch, respectively.

In a further example, a citric acid solution at a pH of 2.0 was applied to wieners for periods of time of 1.00 minute, 2.00 minutes, and 3.00 minutes. The wieners after treatment had skins with thicknesses of 0.033 inch, 0.037 inch, and 0.061 inch respectively.

In solution another example, a citric acid solution at a pH of 4.0 was applied to wieners for periods of time of 20.0 minutes and 60.0 minutes. The wieners had skins with thicknesses of 0.036 inch, and 0.043 inch, respectively.

All of the above wieners were made of the same meat product stuffed in cellulose casings. While all of the wieners had acceptable skins, in general a treatment with an acid at a pH of about 1.5 to about 3.0 for a period from about 2.0 minutes to about 8.0 minutes is preferable.

The skin of the wiener can produce the above advantages over a wide range of thicknesses. An acceptable akin, however, may be defined as having a thickness of from about 0.010 inch to about 0.070 inch. Thinner skins do not provide the above advantages to a significant extent while thicker skins, in general, produce an excessively tough product from the standpoint of edibility.

It has been found that naturally occurring acids and acid mixtures can be used in practicing the instant invention, as well as synthetic acids and acid mixture.

Various modifications of the above-described embodiments of the invention will be apparent to those skilled in the art and it is to be understood that such modifications can be made without departing from the scope of the invention if they are within the spirit and tenor of the accompanying claims.

I

1. In a method for producing skinless wieners which includes the steps of stuffing a plurality of continuous, permeable cellulosic casing sections with a ground meat product, in a relatively fluid state, forming the casing sections into separate but connected links, placing the linked sections in an enclosed zone, heating the linked sections while within the enclosed zone so that all portions thereof are brought to a temperature of at least 152° F., cooling the linked sections, and peeling the casing from the links, the improvement comprising applying to the stuffed casing sections, before the sections are heated within the enclosed zone, and aqueous acid solution at a pH not greater than 4 for a period of time from about 0.10 minute to about 60 minutes sufficient to cause coagulation and the formation of a coagulated skin having a thickness from about 0.010 inch to about 0.070 inch on the surface of the meat product, which skin is effective to improve the peelability of the sections, substantially to prevent migration of grease to the surface of the meat product, and to inhibit entry of bacteria into the meat product, and said coagulation being irreversible upon the subsequent heating of the meat product, and heating the sections after formation of the coagulated skin.

2. In a method for producing skinless wieners which includes the steps of stuffing a continuous, permeable cellulosic casing section with a ground meat product, in a relatively fluid state, forming the casing section into separate but connected links, placing the linked section in an enclosed zone, heating the linked section while within the enclosed zone so that all portions thereof are brought to a temperature of at least 152° F., and cooling the linked section, the improvement comprising applying to the linked casing section an aqueous acid solution at a pH of about 1.5 to about 3.0 for a period of time from about 2 minutes to about 8 minutes sufficient to form a coagulated skin having a thickness from about 0.010 inch to about 0.070 inch at the surface of the meat product before the linked section is heated within the enclosed zone, and heating the section after the formation of the coagulated skin.

3. In a method for producing wieners which includes the steps of stuffing a continuous, permeable casing section with a ground meat product, forming the casing section into separate but connected links, placing the linked section in an enclosed zone, heating the linked section while within the enclosed zone so that all portions thereof are brought to a temperature of at least 152° F., cooling the linked section, and peeling the casing from the links, the improvement comprising placing the linked casing section on a plurality of spaces supports within a spray hood which is spaced from the enclosed zone, and spraying on the outside of the linked casing section an aqueous acid solution at a pH not greater than 4 for a period of time ranging from about 0.10 minute to about 60 minutes to cause coagulation of the meat product at the surface thereof to form a skin having a thickness from about 0.010 inch to about 0.070 inch before the linked section is heated within the enclosed zone.

4. In a method for producing skinless wieners which includes the steps of stuffing a plurality of continuous, permeable cellulosic casing sections with a ground meat product, in a relatively fluid state, forming the casing sections into separate but connected links, placing the linked sections in an enclosed zone, heating the linked sections while within the enclosed zone so that all portions thereof are brought to a temperature of at least 152° F., cooling the linked sections, and peeling the casing from the links, the improvement comprising applying to the linked casing sections an aqueous acid solution at pH not greater than 4 for a period of time from about 0.25 minute to about 30 minutes sufficient to form a coagulated skin of the meat product at the surface thereof before the linked sections are heated within the enclosed zone, said skin having a thickness from about 0.010 inch to about 0.070 inch.

5. The treatment according to claim 4 wherein said aqueous acid solution contains at least two acids.

* * * * *